United States Patent [19]

Gay et al.

[11] Patent Number: 4,697,681
[45] Date of Patent: Oct. 6, 1987

[54] PULL-TYPE CLUTCH RELEASE BEARING ASSEMBLY

[75] Inventors: Christian Gay, Paris; Philippe Lassiaz, Boulogne, both of France

[73] Assignee: Valeo, Paris, France

[21] Appl. No.: 873,878

[22] Filed: Jun. 12, 1986

[30] Foreign Application Priority Data

Jun. 12, 1985 [FR] France .................... 85 08893

[51] Int. Cl.⁴ .................................. F16D 23/14
[52] U.S. Cl. ................................ 192/98; 192/110 B
[58] Field of Search ............... 192/98, 110 B, 99 S, 192/89 B; 308/233

[56] References Cited

U.S. PATENT DOCUMENTS 4,467,904  8/1984  Renaud ............... 192/110 B X
4,519,488  5/1985  Renaud ............... 192/98
4,560,053  12/1985  Lassiaz ............... 192/110 B X
4,588,061  5/1986  Mallet ................. 192/98

Primary Examiner—George H. Krizmanich
Attorney, Agent, or Firm—Young & Thompson

[57] ABSTRACT

A clutch release bearing comprises a drive element through which it is adapted to apply traction to the clutch release device of a clutch and an operating element through which it is adapted to be operated on by a control member. It further comprises a cover with a radial lip for coupling the operating element axially to the driving element. A coupling part attached to the clutch release device has retaining fingers and is fastened to the drive element. Structure is provided for limiting insertion of the drive element into the coupling part fastened to the operating element, consisting of angularly separated axial bearing lands alternating with openings and adapted to serve as abutments facing the coupling part.

4 Claims, 7 Drawing Figures

PULL-TYPE CLUTCH RELEASE BEARING ASSEMBLY

BACKGROUND OF THE INVENTION

1. Field of the invention

The present invention is generally concerned with clutch release bearings, in particular for automobile vehicles.

It is more particularly directed to clutch release bearings of the so-called pull type adapted to operate in traction on the clutch release device of the clutch to be operated and which must be coupled thereto to achieve this.

2. Description of the prior art

In certain clutch release bearing assemblies, and particularly in the clutch release bearing assembly described in U.S. Pat. No. 4,588,061 it is proposed to employ a part hereinafter referred to for convenience as the "coupling part" between the clutch release bearing and the clutch release device to be operated; appropriately fastened to the clutch release device, this part comprises on the side opposite the clutch release bearing a radial bearing flange through which it is adapted to operate on the clutch release bearing, in cooperation with coupling means operative in traction which, disposed between a part referred to hereinafter for convenience as the "drive part" forming part of the clutch release bearing and a part referred to hereinafter for convenience as the "coupling part" are adapted to provide an axial coupling between said parts.

In practice, in the aforementioned patent, the coupling means operative in traction used generally consist of a coupling member which is elastically deformable in the radial direction carried by one of the parts to be fastened together in traction and adapted to cooperate abutment fashion with a drive bearing surface formed generally transversely on the other part for this purpose.

A particular advantage of an arrangement like this is that it makes it possible to fit the coupling part to the clutch release device of the clutch to be operated in advance, before mounting the corresponding clutch cover assembly, and then, at assembly time, to simply interlock the clutch release bearing with the coupling part snap-fastener fashion.

In the embodiments proposed in the aforementioned patent the coupling member is an annular ring referred to hereinafter for convenience as the "coupling ring"; it is at least partially engaged in the radial direction in an annular retaining groove formed on one of the parts to be coupled together in traction, the other of these parts comprising the drive bearing surface with which it has to cooperate to achieve such coupling. The flank of the retaining groove axially opposite the drive bearing surface relative to the coupling ring is generally oblique to the axis of the assembly, diverging from the other flank of the retaining groove. When the clutch release bearing exerts traction on the coupling part through its drive part and, through the intermediary of the coupling part, on the clutch release device of the clutch to be operated, the coupling ring being operative axially between said parts is systematically urged towards the drive bearing surface with which it has to cooperate.

In the abovementioned patent, the part provided with the drive bearing surface comprises, facing the coupling ring, at least one peg projecting away from the drive bearing surface relative to the coupling ring, this peg having a so-called ejection surface that is generally oblique to the axis of the assembly, diverging from the drive bearing surface.

The clutch release bearing + coupling part assembly may then be mounted in the conventional way by simply clipping it on. During demounting it is sufficient to push the coupling ring towards the pegs, using the drive part of the release bearing, the ejection surface of the pegs, being generally oblique to the axis of the assembly, then obliging the ring to retract into the retaining groove that the drive part, for example, features, the coupling ring being adapted to resume its initial shape as soon as the pressure on it has made it pass over the pegs. The coupling ring is then on the opposite side of the coupling part to the clutch release bearing, for example, on the bearing flange that the coupling part features. The release bearing may then be removed, no longer being interlocked with the coupling ring.

The abovementioned patent also concerns a method of mounting a release bearing assembly in which the drive part of the release bearing is snapped into the coupling part with an overtravel, entailing the insertion of the drive part into the coupling part with the drive part insertion travel limited by positioning one or more wedges between the coupling part and the cover of the release bearing to prevent unclipping of the assembly due to ejection of the coupling ring by the peg during mounting. It also concerns a method of demounting a release bearing assembly which entails pushing the coupling ring beyond the peg, the wedge or wedges have been taken out at the end of mounting the assembly.

An implementation of this kind, although satisfactory, requires a large opening to be made in the clutch casing and the wedges to be withdrawn at the end of mounting, not to mention the large number of parts involved.

An object of the present invention is to alleviate this disadvantage by eliminating the use of wedges whilst maintaining highly precise travels.

SUMMARY OF THE INVENTION

The present invention consists in a clutch release bearing assembly in which, for the purpose of coupling the clutch release bearing to the clutch release device of a clutch, the release bearing comprises a drive element through which it is adapted to apply traction to the clutch release device, an operating element through which it is adapted to be operated on by a control member, a cover, a radial lip on said cover for applying said operating element axially to said drive element, a coupling part adapted to be attached to said clutch release device, means for coupling together in traction said coupling part and said drive element, and means for limiting insertion of the drive element into the coupling part said limiting means being fastened to said operating part and consisting of angularly separated axial bearing lands adapted to serve as abutments facing said coupling part and openings alternating with said lands.

The axial lands preferably form a generally radial flange.

During mounting, the generally radial flange makes it possible to continue insertion of the drive part into the coupling part until there is contact between the flange and retaining fingers on the coupling part. According to one characteristic of the invention, the flange is fastened to the cover and forms an extension of the radial lip on the cover to constitute an annular rim.

The thickness of this rim serves the same purpose as the wedges used in the previously mentioned application and makes it possible to mount the release bearing correctly without unclipping the assembly.

In accordace with another aspect of the invention, the flange comprises openings which, in an appropriate orientation of the flange, line up with the retaining fingers, being wider than these fingers.

Simple rotation of the flange relative to the clutch release device therefore makes it possible to insert the retaining fingers into these openings and so to decouple the assembly through further insertion of the drive part into the coupling part, beyond a given position. With the retaining fingers bearing against the flange, for example, it is sufficient to turn the release bearing and so the operating element to enable the retaining fingers to enter the openings in the flange.

Note the low probability that an opening will line up with a retaining finger during mounting. This potential disadvantage may be avoided by the operator who can visually position the release bearing so that this does not happen, all the more easily if it is noted that by turning the release bearing through 180°, the retaining fingers and the openings being spaced at 120°, there will almost always be solid parts of the flange lined up with the retaining fingers.

As compared with the assembly described in the aforementioned U.S. Pat. No. 4,588,061 the invention has the major advantage of not requiring any extraction of wedges through an opening in the clutch casing at the end of mounting, an operation which is difficult to carry out.

Thus the coupling part may be uncoupled from the release bearing without unbolting the clutch cover assembly from the reaction plate and without using any special tools to retract the coupling ring.

Thus it is possible to mount the release bearing+coupling part assembly and to demount it by rotating the flange relative to the retaining fingers. This solution does not entail any modification of the cover, which is simply formed by stamping.

The characteristic and advantages of the invention will emerge from the following description given by way of example with reference to the accompanying schematic drawings.

BRIEF DESCRIPTION OF THE DRAWINGS

FIG. 6 illustrates the insertion of the clutch release bearing with the coupling part provided for this purpose into the clutch release device concerned at assembly time; FIG. 7 illustrates the decoupling of the release bearing assembly.

DESCRIPTION OF THE PREFERRED EMBODIMENT

In the embodiment shown by way of example in the figures the invention is applied to a release bearing assembly of the type described in the aforementioned U.S. Pat. No. 4,588,061.

Figure 1:
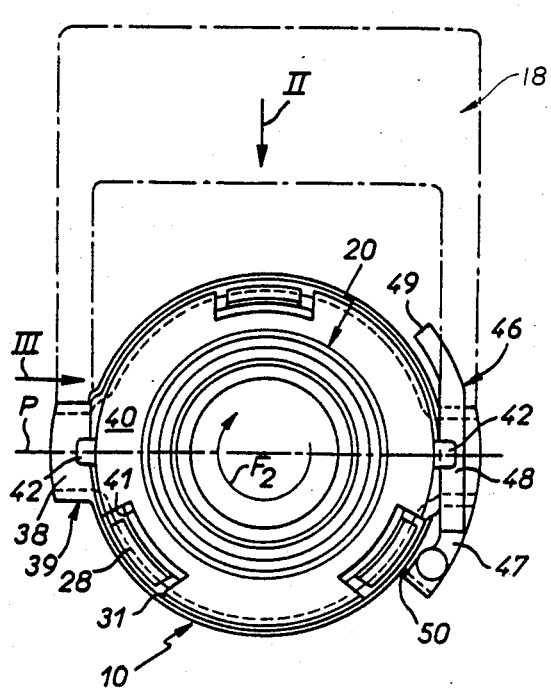
FIG. 1 is a view in elevation of a clutch release bearing in accordance with the invention, shown in the service position.

As can been seen in FIGS. 1, 2 and 3 and as is known per se the clutch release bearing 10 comprises a drive element 20 through which it is adapted to operate on a clutch release device 11 through the intermediary of a coupling part 13, as described in detail hereinafter, an operating element 22 through which it is adapted to be mounted so as to slide axially on any form of guide member 23, for example a flared guide tube, and through which it is further adapted to be operated on by a control member 18 consisting for example and as schematically shown in chain-dotted line in FIGS. 1 and 3 of a clutch release yoke, and coupling means axially attaching the drive element 20 to the operating element 22 while permitting unrestricted relative rotation between them.

Also in a manner known per se, the operating element 22 of the release bearing 10 comprises a sleeve 24 by means of which it is slidably engaged on the guide member 23, an annular flange 25 extending transversely relative to the axis of the assembly at one end of the sleeve 24 and, at the outside perimeter of this annular flange 25, an axial lip 26 coaxial with and extending annularly around the sleeve 24, in the same axial direction as the sleeve 24, in which are formed spaced elastically deformable lugs 28 for snap-fastener fashion retention of a cover 27.

The cover 27 comprises an annular skirt 29 extending around the axis of the assembly through the intermediary of which it is engaged on the axial lip 26 of the operating element 22 and, transversely relative to the axis and at the end of the skirt 29 opposite the annular flange 25 of the operating element 20, an upstanding edge 30 extending radially towards the axis.

Figure 3:
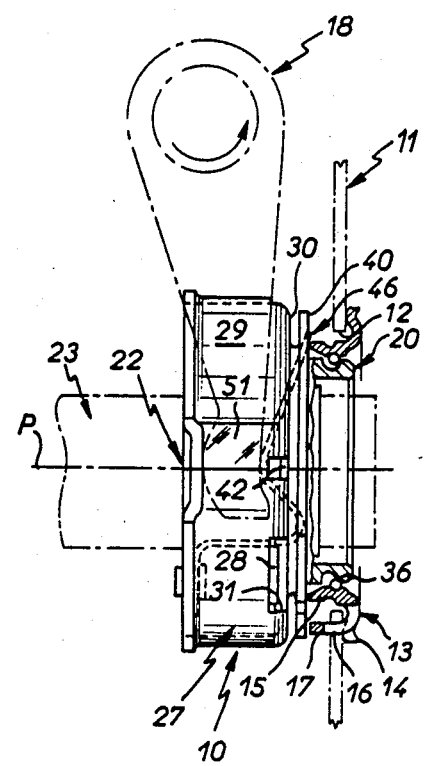
FIG. 3 is a side view of it in the direction of the arrow III on FIG. 1.
Figure 2:
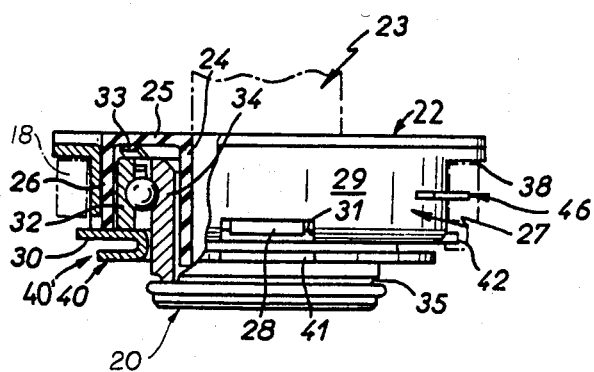
FIG. 2 is a cutaway plan view of it in the direction of the arrow II in FIG. 1.
Figure 4:
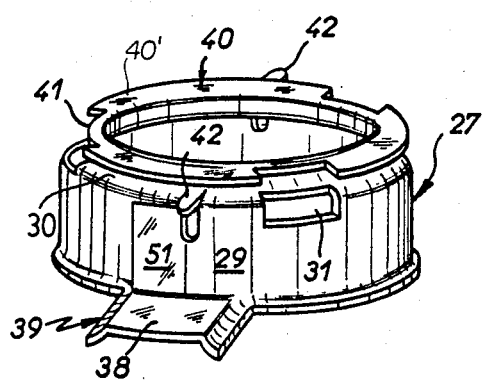
FIG. 4 is a perspective view of the cover used in this clutch release bearing, shown in isolation.

According to one essential characteristics of the invention, as shown in FIGS. 2 through 4 in particular, the cover 27 comprises angularly separated axial bearing lands 40' alternating with openings 41 the role of which will emerge later in the description with reference to FIGS. 6 and 7.

The bearing lands 40' form a generally radial flange 40 constituting an extension of the radial lip 30 forming an upstanding edge on the cover 27 provided with these openings 41.

The width of the openings 41 in the circumferential direction is greater than the circumferential width of the retaining fingers 17 that the coupling part 13 features.

Openings 31 are formed from place to place in the skirt 29, the axial lungs 28 hooking over their transverse edge; the main part of the axial lip 26 on the operating member 22 bears through its edge on the upstanding edge 30 of the cover 27, so coupling the latter to the operating element 22.

In the embodiment shown the drive element 20 is a ball bearing the outer race 32 of which is urged by an axially acting spring washer 33 into bearing engagement against the annular flange 25 of the operating element 22 and bears through its opposite edge on the upstanding edge 30 of the cover 27, its inner race 34 being adapted by a groove 35 to cooperate with an elastic ring 36, the inner race 34 projecting axially for this purpose out of the cover 27 by means of the central opening in the upstanding edge 30 thereof.

The clutch release bearing 10 in accordance with the invention comprises two transverse bearing facets 38 at diametrically opposed positions for the clutch release yoke 18 to operate on; each forms part of a lug 39 which is in one piece with the cover 27, extending transversely away from the axis of the assembly from the end of the skirt 29 of the latter opposite its upstanding edge 30.

It is therefore through the intermediary of the cover 27 that the operating element 22 is in this case adapted to be acted on by the clutch release yoke 18.

The clutch release bearing 10 further comprises two parallel axial guide facets 51 for the clutch release yoke 18 to act on, extending in a generally axial direction and disposed one on each side of the axial plane P of the assembly that is substantially perpendicular to them.

The function of these axial guide facets 51 is to cooperate through contact with the lateral surfaces of the fingers of the clutch release yoke 18, to prevent the clutch release bearing 10 rotating about its axis.

The release bearing 10 further comprises elastic means for continuously urging the control member towards the transverse bearing facets 38.

These elastic means comprise a leaf spring 46 with a first section 47 through which it is supported on a radial lug 50 on the release bearing, a second section 48 extending generally parallel to a transverse bearing facet, and a third section 49 forming its free end.

The second section 48 of the leaf spring 46 is of generally S-shaped configuration as seen from the side (FIG. 3) so as to bear on one of the transverse surfaces of the finger of the yoke 18 corresponding to the bearing facet 38 concerned.

Figure 5:
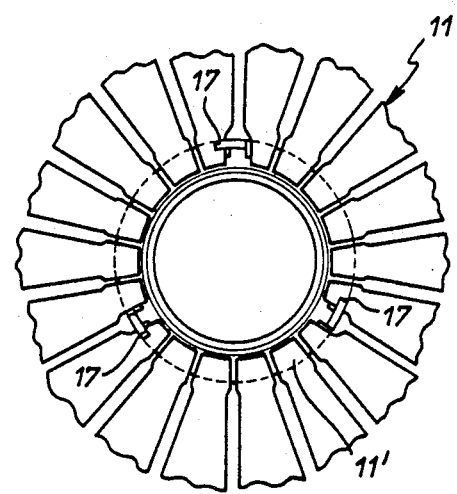
FIG. 5 is a view in elevation of a clutch diaphragm behind which is inserted a coupling part provided with retaining fingers.

In a manner that is known per se and as specifically shown in FIG. 5, the clutch release device 11 is formed by the end 11' of the radial fingers of a diaphragm. For coupling the clutch release bearing 10 to the clutch release device 11 so that the clutch release bearing 10 can operate in traction on the clutch release device 11 the coupling part 13 is attached to the latter by means of the central opening 12.

As shown more particularly in FIG. 3 the coupling part is of the kind described in the aforementioned U.S. Pat. No. 4,588,061. On the side of the clutch release device 11 opposite the clutch release bearing 10, it has a radial flange 14 called the bearing flange for the clutch release device 11 to operate on. The bearing flange is appropriately shaped for this purpose and comprises, in one piece with it, a bush 15 extending generally axially through the clutch release device 11 by means of the central opening 12 therein; at the edge of this flange, on the same side as the clutch release bearing 10, there are spaced axially projecting lugs 16 carrying the retaining fingers 17 which overhang circumferentially, parallel to the bearing flange 14; the bearing fingers 17 are adapted to procure, in cooperation with the bearing flange 14, axial retention of the assembly to the clutch release device 11.

In a manner that is known per se, coupling means operative in traction are disposed between the drive part 20 of the clutch release bearing 10 and the coupling part 13 carried by the clutch release device 11, so as to couple the two parts 20 and 13 axially.

Figure 6:
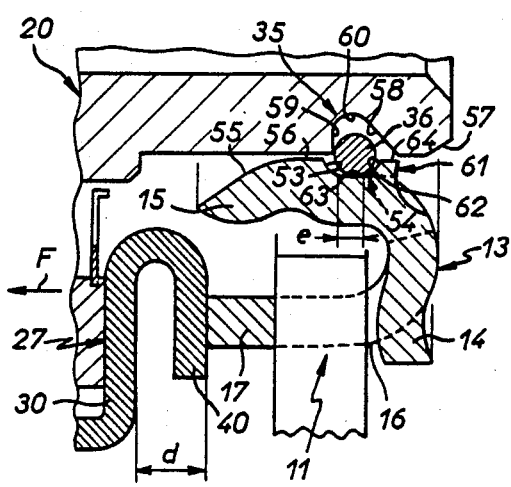
FIGS. 6 and 7 are views of part of FIG. 3 to a larger scale.

These coupling means are shown in FIG. 6.

The drive part 20 is inserted into the bush 15 of the coupling part 13 so that the coupling means operative in traction are operative between the outside surface of the drive part 20 and the inside surface of the bush 15.

In a manner that is known per se they comprise an annular ring 36 called the coupling ring that is elastically deformable in the radial direction and at least partially inserted into an annular retaining groove 35 formed on the drive part and a drive bearing surface 53 facing towards the side of the bearing flange 14 of the coupling part 13 and formed generally transversely on the bush 15 of the coupling part 13.

In the embodiment shown the drive bearing surface 53 is a toroidal bearing surface that follows on from a generally cylindrical bearing surface 54 of the bush 15 of the coupling part 13. It is disposed at the end of this cylindrical bearing surface 54 and merges tangentially therewith.

On the same side as the clutch release device 10 the bush 15 of the coupling part 13 forms at the end of its inside surface a frustoconical engagement bearing surface 55 the concave side of which faces towards the clutch release bearing 10.

Similarly, the drive part 20 of the clutch release bearing 10 has a frustoconical engagement bearing surface 57 at its free end.

In the type of release bearing assembly shown in FIG. 6, the flank 58 of the retaining groove 35 axially opposite the drive bearing surface 53 of the coupling part 13 relative to the coupling ring 36 is generally oblique to the axis of the assembly, diverging from the other flank 59 of the retaining groove 35 in the direction away from this axis.

The cross-section of the bottom 60 of the retaining groove 35 has a curved profile complementing that of the coupling ring 36; its oblique flank 58 merges with it tangentially and its other flank 59 is upright.

The coupling part 13 further comprises, facing the coupling ring 36, at least one ejector peg 61 projecting away from the drive bearing surface 53 relative to the coupling ring 36, each peg 61 having an ejection surface 62 generally oblique to the axis of the assembly, diverging from the drive bearing surface 53. An axial space is left between the points where the ejection surface 62 and the drive bearing surface 53 merge with the cylindrical bearing surface 54 of the bush 15.

Each peg 61 has a horizontal retaining surface 64.

The coupling of the clutch release bearing 10 of the clutch release device 11, by which is meant the mounting of the release bearing assembly shown in the figures, and the decoupling of the component parts of this assembly will now be described with reference to FIGS. 6 and 7.

With the coupling part 13 in place on the clutch release device 11, the coupling ring 36 is positioned in advance on the clutch release bearing 10, more precisely on the drive part 20 thereof, in the retaining groove provided for this purpose.

The clutch release bearing 10 and the coupling part 13 are then moved axially towards each other, with the drive part 20 of the clutch release bearing inserted into the bush 15 of the coupling part.

This axial movement towards each other is effected by virture of cooperation of the fingers of the yoke 18 with lugs 42 provided for this purpose on the cover 27 in line with the upstanding edge 30.

Because of the frustonical engagement bearing surface 55 of the coupling part 13, the coupling ring 36 is pushed back into the retaining groove 25 in the drive part 20 of the clutch release bearing 10.

Reaching a position in line with the drive bearing surface 53 of the coupling part 13, it is again deployed elastically and so interlocks with the drive bearing surface.

Means for limiting the insertion of the drive part 20 into the coupling part 13 make it possible for the coupling ring to be deployed again whilst ensuring a secure snap-fastener type engagement.

In accordance with the invention, these means consist of the axial bearing lands 40' on the flange 40 fastened to the generally radial operating element 22 adapted to cooperate with the retaining fingers 17 of the coupling part 13 and provided with openings 41 for the fingers 17 to pass through.

Thus when the release bearing assembly is fitted, as shown in FIG. 6, the release bearing is oriented so that, on inserting the drive part 20 of the release bearing into the bush 15 of the coupling part 13, the retaining fingers 17 bear on the bearing lands 40' of the flange 40.

The flange 40 forms an annular rim of thickness d relative to the radial lip 30 of the cover 27 which limits this insertion so that the coupling ring 36 is not pushed beyond the point 63 at which the ejection surface 62 merges with the cylindrical bearing surface 54 of the coupling part 13, to prevent the pegs exterting their function, in other words, to prevent the ring 36 being ejected. Note also that the edge 30 of the cover 27 protects the bearing.

This annular rim thus makes it possible at assembly time to continue the insertion of the release bearing 10 to a degree sufficient to procure correct deployment of the coupling ring 36.

The axial coupling of the drive part 20 of the release bearing 10 to the coupling part 13 is thus securely obtained.

Figure 7:
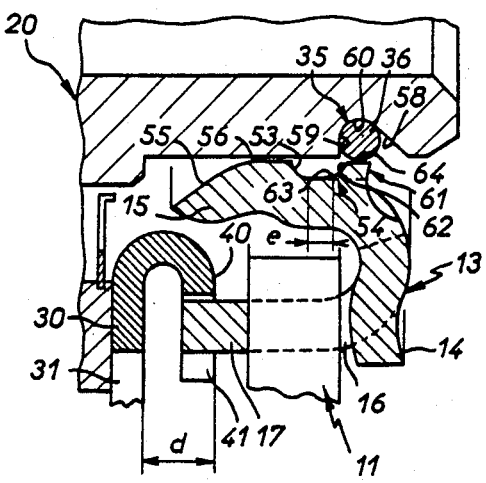

Note in FIG. 7 that the flange 40 bears against the retaining fingers 17 of the coupling part by virtue of a displacement of the cover 27 through the yoke 18 pressing on the fingers 42.

To carry out the uncoupling of the clutch release bearing 10 from the coupling part 13 fastened to the clutch release device 11 as shown in FIG. 7 it is then sufficient to turn the operating element until the openings 41 in the flange 40 are lined up with the retaining fingers 17.

Insertion of the drive part 20 into the bush 15 of the coupling part 13 then continues. Uncoupling is achieved by pushing the coupling ring 36 in the axial direction opposite to that shown by the arrow F, by virtue of the action of the upright flank 59 of the retaining groove 35 that the drive part 20 comprises in combination with that of the pegs 61.

As shown in FIG. 7, the coupling ring 36 is then pushed back towards the bottom of the retaining groove 35 for as long as its displacement along the retaining surface 64 continues.

As soon as it has passed this surface, the coupling ring resumes its original shape. It is then free to escape to the outside of the drive part 20 of the release bearing 10.

The release bearing 10 may then be removed simply by pulling on the clutch release bearing 10 in the direction shown by the arrow F and recovering the coupling ring 36.

The flange 40 with its axial bearing lands 40' may, of course, be clipped to the cover 27.

Similarly, it may be fastened to the lugs 28 of the operating element, for example by ultrasonic welding.

The invention is, of course, not limited to the embodiments described and shown, but encompasses any variant execution and/or implementation.

Specifically, in the embodiment shown in FIGS. 1 through 7, the openings 41 in the flange 40 are advantageously disposed opposite the openings 31 in the casing 27 and have the same width as them, although this is not an essential characteristic of the invention.

There is claimed:

1. Clutch release bearing assembly in which, for the purpose of coupling the clutch release bearing to the clutch release device of a clutch, the release bearing comprises a drive element through which it applies traction to the clutch release device, an operating element through which it is operated on by a control member, a cover, a radial lip on said cover for applying said operating element axially to said drive element, a coupling part attached to said clutch release device, means for coupling together in traction said coupling part and said drive element, and means for limiting insertion of the drive element into the couplinclutch release device of a clutch, the release bearing comprises a drive element through which it applies traction to the clutch release device, an operating element through which it is operated on by a control member, a cover, a radial lip on said cover for applying said operating element axially to said drive element, a coupling part attached to said clutch release device, means for coupling together in traction said coupling part and said drive element, and means for limiting insertion of the drive element into the coupling part said limiting means being fastened to said operating element and consisting of angularly separated axial bearing lands adapted to serve as abutments facing said coupling part and openings alternating with said lands.

2. Clutch release bearing assembly according to claim 1, wherein said axial lands form a generally radial flange.

3. Clutch release bearing assembly according to claim 2, wherein said coupling part comprises retaining fingers and said flange is an extension of said radial lip on said cover, cooperations with said retaining fingers and features openings adapted to allow said retaining fingers to pass through the flange in a decoupled angular position of said release bearing relative to said coupling part.

4. Clutch release bearing assembly according to claim 3, wherein the width of said openings in said flange is only slightly greater than the width of said retaining fingers in the circumferential direction.

* * * * *